United States Patent [19]

Kaneko

[11] Patent Number: 5,561,672

[45] Date of Patent: Oct. 1, 1996

[54] APPARATUS FOR PREVENTING COMPUTER DATA DESTRUCTIVELY READ OUT FROM STORAGE UNIT

[75] Inventor: Hiroyuki Kaneko, Tokyo, Japan

[73] Assignee: Kabushiki Kaisha Toshiba, Kanagawa, Japan

[21] Appl. No.: 933,728

[22] Filed: Aug. 24, 1992

[30] Foreign Application Priority Data

Aug. 27, 1991 [JP] Japan .................................. 3-215258
Mar. 2, 1992 [JP] Japan .................................. 4-044696

[51] Int. Cl.$^6$ .................................................. G06F 11/10
[52] U.S. Cl. ..................... 371/51.1; 395/250; 395/873; 371/67.1
[58] Field of Search ................ 371/7, 10.1, 13, 371/21.1, 21.2, 40.1, 40.4, 51.1, 48, 49.1, 67.1, 36, 69.1; 395/425, 250, 853, 872, 873

[56] References Cited

U.S. PATENT DOCUMENTS

| | | | |
|---|---|---|---|
| 3,037,191 | 5/1962 | Crosby | 340/172.5 |
| 3,585,378 | 5/1971 | Bouricius . | |
| 3,649,963 | 3/1972 | Holm | 340/146.1 |
| 3,863,215 | 1/1975 | McGrogan, Jr. | 371/69.1 |
| 4,792,898 | 12/1988 | McCarty et al. | 364/200 |
| 5,068,785 | 11/1991 | Sugiyama | 395/325 |
| 5,166,936 | 11/1992 | Ewert et al. | 371/21.6 |
| 5,173,619 | 12/1992 | Gaudenzi et al. | 371/49.1 |
| 5,177,744 | 1/1993 | Cesare et al. | 371/10.1 |
| 5,185,876 | 2/1993 | Nguyen et al. | 395/425 |
| 5,233,618 | 8/1993 | Glider et al. | 371/68.1 |
| 5,239,646 | 8/1993 | Kimura | 364/200 |
| 5,261,084 | 11/1993 | Hashiguchi et al. | 395/575 |
| 5,283,791 | 2/1994 | Halford | 371/40.4 |
| 5,285,451 | 2/1994 | Henson et al. | 371/40.1 |
| 5,313,627 | 5/1994 | Amini et al. | 371/49.1 |
| 5,381,418 | 1/1995 | Montoye | 371/21.2 |
| 5,414,222 | 5/1995 | Tollum | 371/69.1 |
| 5,428,766 | 6/1995 | Seaman | 395/200 |

FOREIGN PATENT DOCUMENTS

| | | |
|---|---|---|
| 0109308 | 5/1984 | European Pat. Off. . |
| 0248478 | 12/1987 | European Pat. Off. . |
| 2-77863 | 3/1990 | Japan . |

Primary Examiner—Robert W. Beausoliel, Jr.
Assistant Examiner—Albert Decady
Attorney, Agent, or Firm—Foley & Lardner

[57] ABSTRACT

A data transfer control system for a computer for preventing destructive read out of data from an external storage unit during a data transfer operation to a storage unit of the computer. The system employs a first buffer memory for temporarily storing the series of data read out from the external storage unit, a second buffer memory for temporarily storing the series of data transferred from the first buffer memory and a judging unit for determining whether or not the last single data word of the data stream stored in the first buffer is coincident with the last single data word of the data stream stored in the second buffer. If the words fail to coincide, the system issues an abnormal data transfer signal.

21 Claims, 10 Drawing Sheets

APPARATUS FOR PREVENTING COMPUTER DATA DESTRUCTIVELY READ OUT FROM STORAGE UNIT

BACKGROUND OF THE INVENTION

1. Field of the Invention

The present invention generally relates to an apparatus capable of preventing destructive read out of computer data from a storage unit. More specifically, the present invention is directed to an apparatus capable of detecting an error when data are mistakenly transferred from a storage unit, having a large memory capacity, e.g., a mass storage unit such as a magnetic or optical disk unit to a main memory unit typically having a smaller memory capacity, e.g., RAM, employed in a computer system. It should be noted that, as used herein the expression "magnetic disk unit" refers to any mass storage unit including, but not limited to, magnetic disk media, magnetic tape units and optical storage media.

2. Description of Prior Art

In general, a data transfer operation between a main memory unit, such as a RAM, and a magnetic or optical disk unit having a larger memory capacity than that of the main memory unit in a computer data transfer system is performed in such a manner that a data stream read out from the magnetic or optical disk unit is transferred to the main memory unit via a mass storage or magnetic disk control unit, a channel unit and a transfer path of the main memory unit. To guarantee accurate transfer of the data, a parity bit is added to a data stream for each arbitrary bit length of the data stream, for instance for each data block. As a result, destructive readout, e.g., read out of changed bit data, from the magnetic or optical disk unit can be avoided. As is known in the art, since such a parity bit is added to the data stream, when a fault such as a "bit change" happens to occur in the data on the data transfer path, i.e., the magnetic disk control unit, this fault may be detected as a so-called "parity check error". This parity check error is reported to a CPU (central processing unit) provided with a host computer unit. In response to this fault report, this CPU determines that the data stream read out from the magnetic disk unit corresponds to an abnormal data stream, instructs that the abnormal data stream be discarded, and then accesses another data stream stored in a storage region of the magnetic disk unit, which is again transferred therefrom to the main memory unit. As described above, even when a fault such as a "bit change" occurs in the data to be transferred, destructive readout of the data can be prevented in the conventional computer data transfer system.

However, if, for instance, a data block having a shortage of one data word is transferred from the magnetic disk unit to the main memory unit, it is particularly difficult for conventional computer data transfer systems to detect abnormal or faulty data transfer operations.

Although the parity bit is added to the data stream for each arbitrary bit length in order to detect a faulty data transfer operation, the above-described parity check function is insufficient to detect an error in the conventional computer data transfer system, when, for example, one data block from which one data word had been dropped out would be mistakenly transferred from the magnetic disk unit via the above-described data transfer path to the main memory unit. This is because both the data and the parity bit are received at the same time by the parity bit checking unit of the conventional computer data transfer system.

Similarly, when, for instance, one data block with one extra data word is mistakenly transferred from the magnetic disk unit via the data transfer path to the main memory unit, another problem occurs in the conventional computer data transfer system because the parity check function does not operate to correctly carry out fault detection.

The present invention solves the above-described problems of the conventional computer data transfer system, and has as an object to provide a computer destructive data readout prevention apparatus capable of detecting abnormal conditions of data streams to be transferred, e.g., a data stream with an extra data word, thereby preventing destructive data readout and also improving reliability of the entire data transfer system.

Another object of the present invention is to provide a computer destructive data prevention apparatus capable of judging that fault data read out from a first memory unit having a large memory capacity is mistakenly transferred to a second memory unit having a small memory capacity employed in a computer, thereby avoiding execution of such a destructive data readout prior to the data process operation in the computer.

SUMMARY OF THE INVENTION

To achieve the above-described objects, an apparatus for controlling a series of data to be transferred between a first storage unit (5) having a first storage capacity and a second storage unit (1) of a computer (100), having a second storage capacity smaller than the first storage capacity, according to the present invention, includes:

first buffer memory means (21) for temporarily storing the series of data read out from the first storage unit (5);

second buffer memory means (29) for temporarily storing the series of data transferred from the first buffer memory means (21); and buffer checking/controlling means (300) for checking whether a storage condition of the second buffer memory means (29) corresponds to an empty state, thereby setting an empty flag when the storage condition becomes empty. The buffer checking/controlling means is also used for controlling transfer operations for the series of data from the first buffer memory means (21) to the second buffer memory means (29) and from the second buffer memory means (29) to the second storage means (1) of the computer (100) in such a manner that if, after the series of data read out from the first storage unit (5) has been transferred via the first and second buffer memory means (21:29) to the second storage unit (1), the empty flag is not yet set, an abnormal data transfer signal is issued. This prevents destructive read out of the data from the first storage unit (5).

Furthermore, an apparatus for controlling a series of data to be transferred between a first storage unit (5) having a first storage capacity and a second storage unit (1) of a computer (100), having a second storage capacity smaller than the first storage capacity, according to the present invention, includes:

first buffer memory means (21) for temporarily storing the series of data read out from the first storage unit (5);

second buffer memory means (29) for temporarily storing the series of data transferred from the first buffer memory means (21); and judging means (25) for determining whether or not the series of data has been transferred from the first storage means (21) via the first buffer memory means (21) and the second buffer memory means (29) to the second storage unit (1) of the computer (100) by checking whether or not a preselected data word contained in the data of the first buffer memory means (21) is coincident with a preselected data word contained in the data of the second buffer memory means (29).

BRIEF DESCRIPTION OF THE DRAWINGS

For a better understanding of these and other objects of the invention, reference is made to the following detailed description of the invention to be read in conjunction with the following drawings, in which.

DETAILED DESCRIPTION OF THE PREFERRED EMBODIMENTS

Before detailing various preferred embodiments, underlying principles of the invention are described. Generally, a destructive data readout prevention apparatus according to the invention may be constructed based upon the following basic principles. First, a computer destructive data readout prevention apparatus is arranged to have:

- a first buffer for temporarily storing a data stream to be transferred from an external storage unit, typically a mass storage device (e.g., magnetic disk unit, magnetic tape unit, optical storage media) to a main memory unit (e.g., RAM) of a computer and vice versa;
- a second buffer for temporarily storing the data stream to be transferred from the first buffer to either the external storage unit, or the main memory unit; and
- a judging unit for determining whether or not the last single data word of the data stream stored in the first buffer is coincident with the last single data word of the data stream stored in the second buffer. When the last single data word of the data stream in the first buffer is coincident with the last single data word of the data stream stored in the second buffer, a normal data transfer operation is performed. When this is not the case (the last data word in the first and second buffers are not coincident) an abnormal (fault) data transfer operation is carried out.

With the above-described arrangement, by comparing the last data words of the data streams stored in the first and second buffers, respectively, if a coincidence or match exists, it can be judged that the data stream has been transferred between the external storage unit and the main memory unit under the normal condition. Conversely, if the last data word of the data stream stored in the first buffer does not match or is not coincident with that of the data stream stored in the second buffer, it can be quickly determined that an abnormal, or faulty data transfer operation has been performed between them.

A second principle is that a computer destructive data readout prevention apparatus be constructed of at least first and second buffers employed in a magnetic disk control unit for controlling a magnetic disk unit, or other mass storage control unit (e.g., optical storage media), as previously described. This is an external storage unit having a large memory capacity. A data stream is transferred between the magnetic disk unit and a main memory unit having a smaller memory capacity. The first buffer is connected to the magnetic disk apparatus, so as to temporarily store a data stream read out from the magnetic disk apparatus. The second buffer is connected to receive this data stream derived from the first buffer. The computer destructive data readout prevention apparatus further includes a buffer control unit for checking whether or not the storage region of the second buffer is empty and for setting an empty flag when the storage region of the second buffer becomes empty. This buffer control unit also produces a data destruction detection signal if and when the second buffer is not empty after all of the data stream read out from the magnetic disk or other mass storage apparatus has been transferred to the main memory unit in the computer.

In this computer destructive data readout prevention apparatus, after all of the data stream read out from the first buffer has been transferred via the second buffer to the main memory unit of the computer, the buffer control unit determines whether or not the storage condition of the second buffer becomes empty in response to the empty flag. When a portion of the above-described data stream is still left in the second buffer, and thus the storage condition thereof is not empty, the buffer control unit judges that a faulty data transfer operation has occurred and, in response, produces the data destruction detecting signal.

It should be noted that although the coincidence check was done using the last single data word of the respective buffered data streams in the above-described first underlying principle, the present invention is not limited thereto. For instance, such a coincidence check may be performed for an arbitrary data word, and/or for a predetermined number of data words "N" ("N" being greater than 1) counted from the last single data word.

A First Preferred Embodiment

Figure 1A:
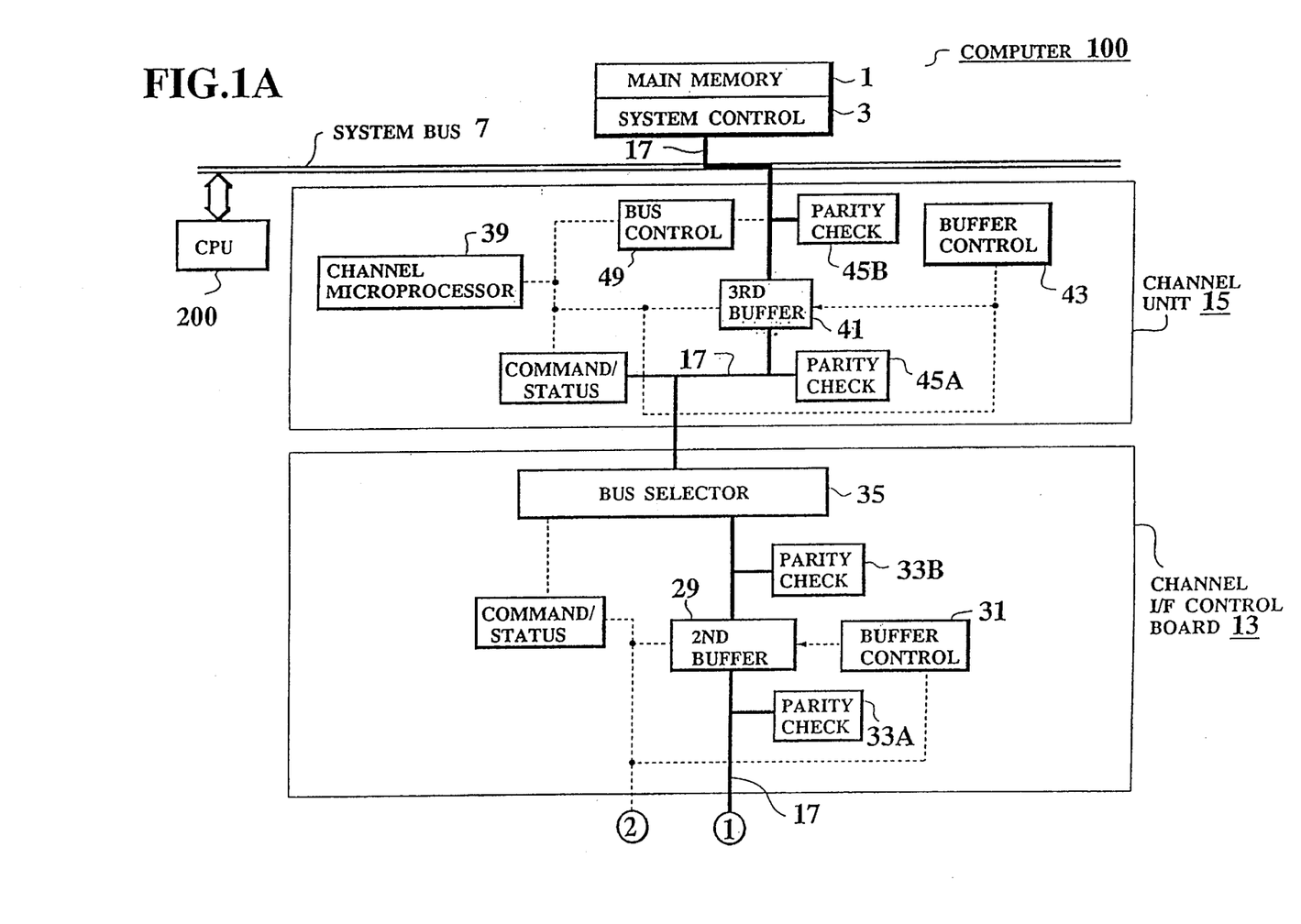
FIGS. 1A and 1B are schematic block diagrams representing an overall arrangement of a computer destructive data readout prevention apparatus according to a first preferred embodiment of the invention.
Figure 1B:
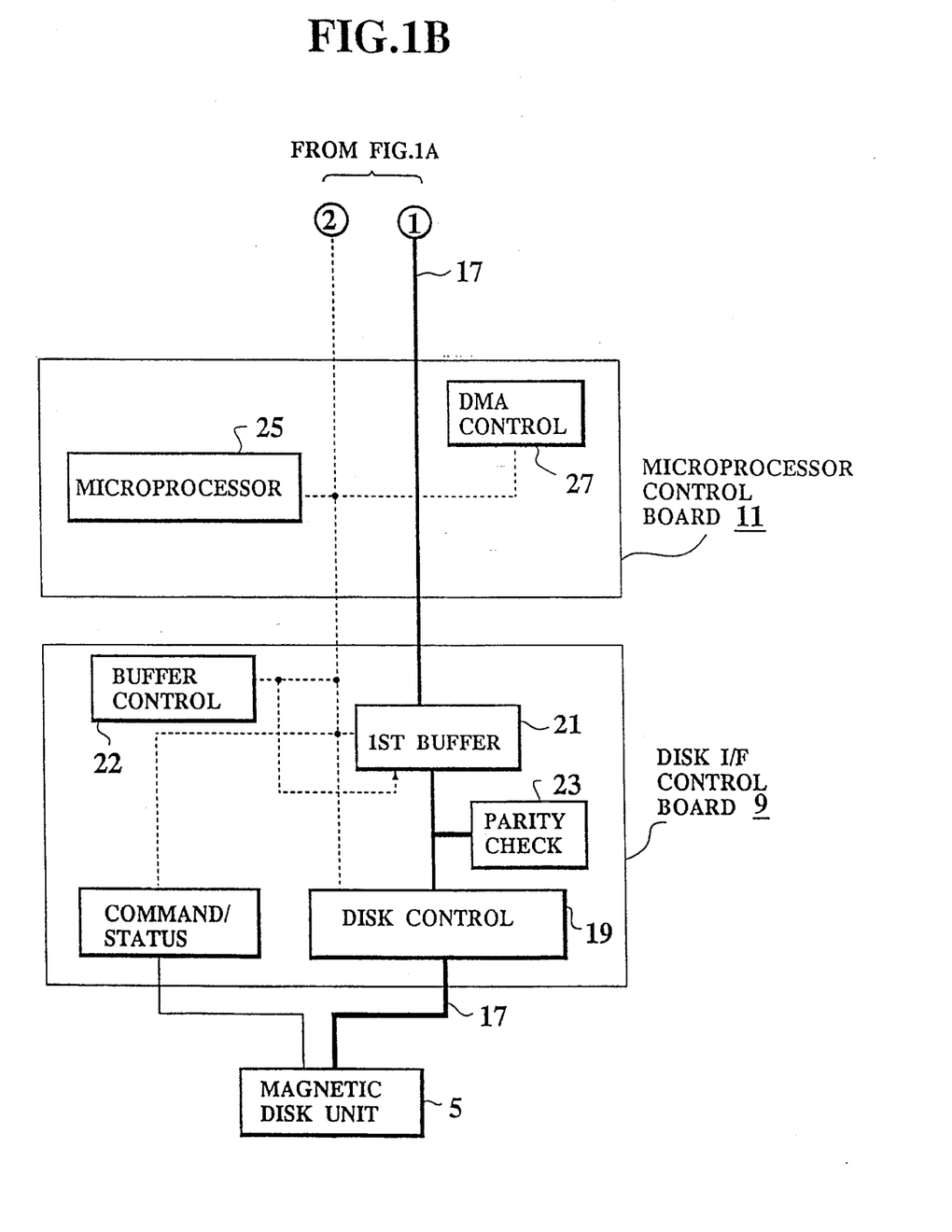
Figure 2:
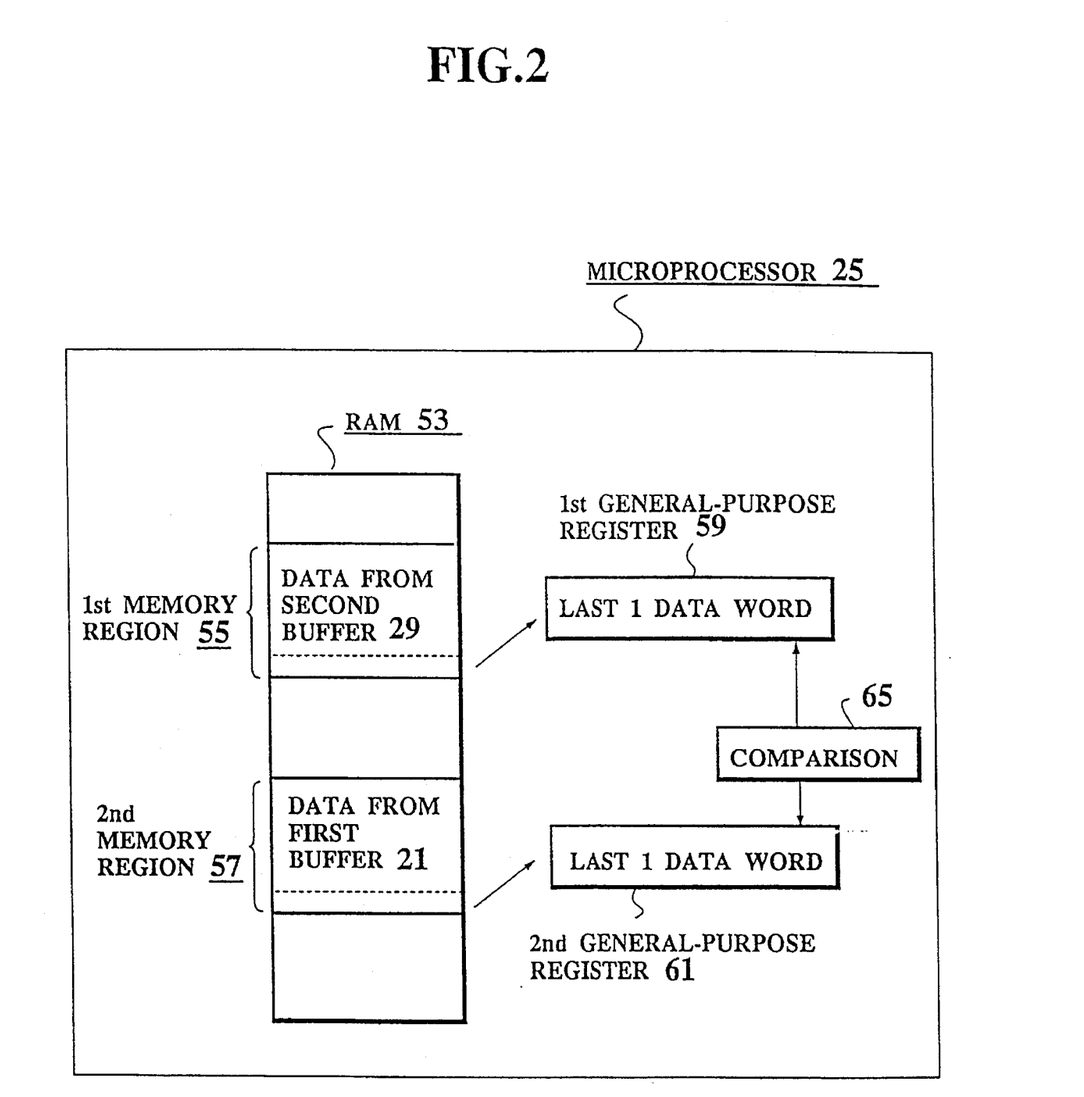
FIG. 2 shows major functions of the microprocessor 25 employed in the first computer destructive data readout prevention apparatus of FIG. 1.

FIGS. 1A and 1B show an overall arrangement of a destructive data readout prevention apparatus according to a first preferred embodiment of the invention. FIG. 2 illustrates the major data transfer control operations performed in the first destructive data readout prevention apparatus of FIGS. 1A and 1B. It should be noted that the first destructive data readout prevention apparatus is realized employing the first underlying principle discussed above.

In FIG. 1A, a main memory unit 1, such as a RAM (random access memory), employed in a computer 100 stores desired data at predetermined addresses thereof. The computer 100 further includes a system control unit 3 for controlling data access operations to this main memory unit 1. A mass storage unit, such as magnetic disk unit 5 (see FIG.

1B) in the first destructive data readout prevention apparatus, provided to transfer data to main memory unit 1, has a large quantity of data stored in its magnetic disk (not shown in detail). It should be noted that magnetic disk unit 5 can be replaced by any mass storage media, including, but not limited to, magnetic tape and optical storage media.

The main memory unit 1 of the computer 100 is coupled with the magnetic disk unit 5 via a data transmission path 17, as represented in FIGS. 1A and 1B. Along this data transmission path 17, there are provided, as viewed at a side of the magnetic disk unit 5, a disk I/F (interface) control board 9, a microprocessor control board 11, a channel I/F control board 13, a channel unit 15, and also a system bus 7 interfaced with a CPU (central processing unit) 200 of the computer 100.

As represented in FIG. 1B, the above-described disk I/F control board 9 is connected via the data transmission path to the magnetic disk unit 5, so as to receive data read out from the magnetic disk unit 5. The disk I/F control board 9 is constructed of a disk control circuit 19, a DMA (direct memory access) data buffer 21, a buffer control circuit 22 and a parity check circuit 23. The disk control circuit 19 functions to control data read/write operations with respect to the magnetic disk of the magnetic disk apparatus 5. The DMA data buffer (i.e., a first buffer) 21 temporarily stores either the data read out from the magnetic disk under control of the buffer control circuit 22, or the data to be written into the magnetic disk under control of this buffer control circuit 22, into a predetermined memory address thereof. The parity check circuit 23 executes the normal parity check for the data transferred via the data transmission path 17 between the disk control circuit 19 and the first buffer 21. It should be noted that various commands and status signals used to control the magnetic disk unit 5 and the like are supplied from a microprocessor 25 (as discussed below) within this disk I/F control board 9.

The microprocessor control board 11 controls the overall magnetic disk control unit 19, and contains the above-mentioned microprocessor 25 and a DMA control unit 27. The microprocessor 25 controls the data transfer between the magnetic disk unit 5 and the main memory unit 1 by way of a firmware function thereof. The DMA control unit 27 executes DMA (direct memory access) control in response to a DMA permission signal sent from the microprocessor 25.

Returning back to FIG. 1A, the channel I/F control board 13 is coupled to a host device, e.g., CPU 200 through channel unit 15 via the system bus 7. This channel I/F control board 13 includes a DMA data buffer (second buffer) 29, a buffer control unit 31, parity check circuits 33A and 33B, and also a bus selector 35. The DMA data buffer (namely, the second buffer) 29 corresponds to such a buffer for transferring data between the main memory unit 1 and the DMA data buffer (first buffer) 21, and for storing at a predetermined memory address the data to be transferred under control of the buffer control unit 31. The former parity check circuit 33A performs the normal parity check operation for the data on the transmission path 17 between the DMA data buffer (first buffer) 21 and the DMA data buffer (second buffer) 29, whereas the latter parity check circuit 33B executes the normal parity check operation for the data on the data transmission path 17 between the second buffer 29 and the bus selector 35. The bus selector 35 performs bus select control in response to a command issued from the microprocessor 25.

The channel unit 15 performs data input/output control with respect to the main memory unit 1 of the computer 100. This channel unit 15 includes a channel microprocessor 39, a DMA data buffer (third buffer) 41, a buffer control unit 43, parity check circuits 45A, 45B, and a system bus control unit 49. The third buffer 41 stores, at a predetermined address thereof, the data read from/written into the main memory unit 1 under control of the buffer control unit 43. Similarly, the former parity check circuit 45A performs the normal parity check for the data on the transmission path 17 between the third buffer 41 and the bus selector 35, while the latter parity check circuit 45B executes the normal parity check for the data on the transmission path 17 between the main memory unit 1 and the third buffer 41. The system bus control unit 49 controls the system bus 7 to which CPU 200 is connected.

FIG. 2 illustrates an internal arrangement of the microprocessor 25 employed in the microprocessor control board 11. Microprocessor 25 and associated registers form a buffer checking/controlling means, as described below. The buffer/checking controlling means described herein can be implemented by other circuitry, as would be known to those of ordinary skill in this art. A data storage unit 53 inside the microprocessor 25 is constructed of a RAM (random access memory). This RAM 53 has first and second memory regions 55 and 57. In the first memory region 55, a data stream (for instance, 5 data blocks) has been stored. This data stream was read out from the magnetic disk unit 5 and then temporarily stored in the first buffer 21, and was then temporarily stored in the second buffer 29. Thereafter, this data stream was read out from the second buffer 29 and then transferred to the first memory region 55 via the data transmission path 17. In other words, the data stream which was read from the second buffer 29 has been stored in the first memory region 55.

Another data stream, which was read from the first buffer 21, has been stored in the second memory region 57. The microprocessor 25 further includes a first general-purpose register 59 and a second general-purpose register 61. Both of the first and second general-purpose registers 59 and 61 are arranged as, for instance, 32-bit registers, respectively, having the same data width (i.e., 32 b its) as that of the transmission path 17. The last data word of the data stream stored in the first memory region 55 of RAM 53 is read and then is stored in the first general-purpose register 59. The last data word of the data stored in the second memory region 57 is read and stored in the second general-purpose register 61. Under control of the firmware of the microprocessor 25, the last data word stored in the first general-purpose register 59 (i.e., data from the second buffer 29) is compared with the last data word stored in the second general-purpose register 61 (i.e., data from the first buffer 21), so as to check whether or not the data word in the first general purpose register 59 (the former data word) matches or is coincident with the data word in the second general purpose register 61 (the latter data word). If the former data word matches or is coincident with the latter data word, then the microprocessor 25 judges that all of the data stream has been completely transferred from the magnetic disk unit 5 to the main memory 1 under normal conditions. Conversely, if the former data word is not coincident with or does not match the latter data word, then the microprocessor 25 judges that the data stream has been transferred under an abnormal condition.

Figure 3:
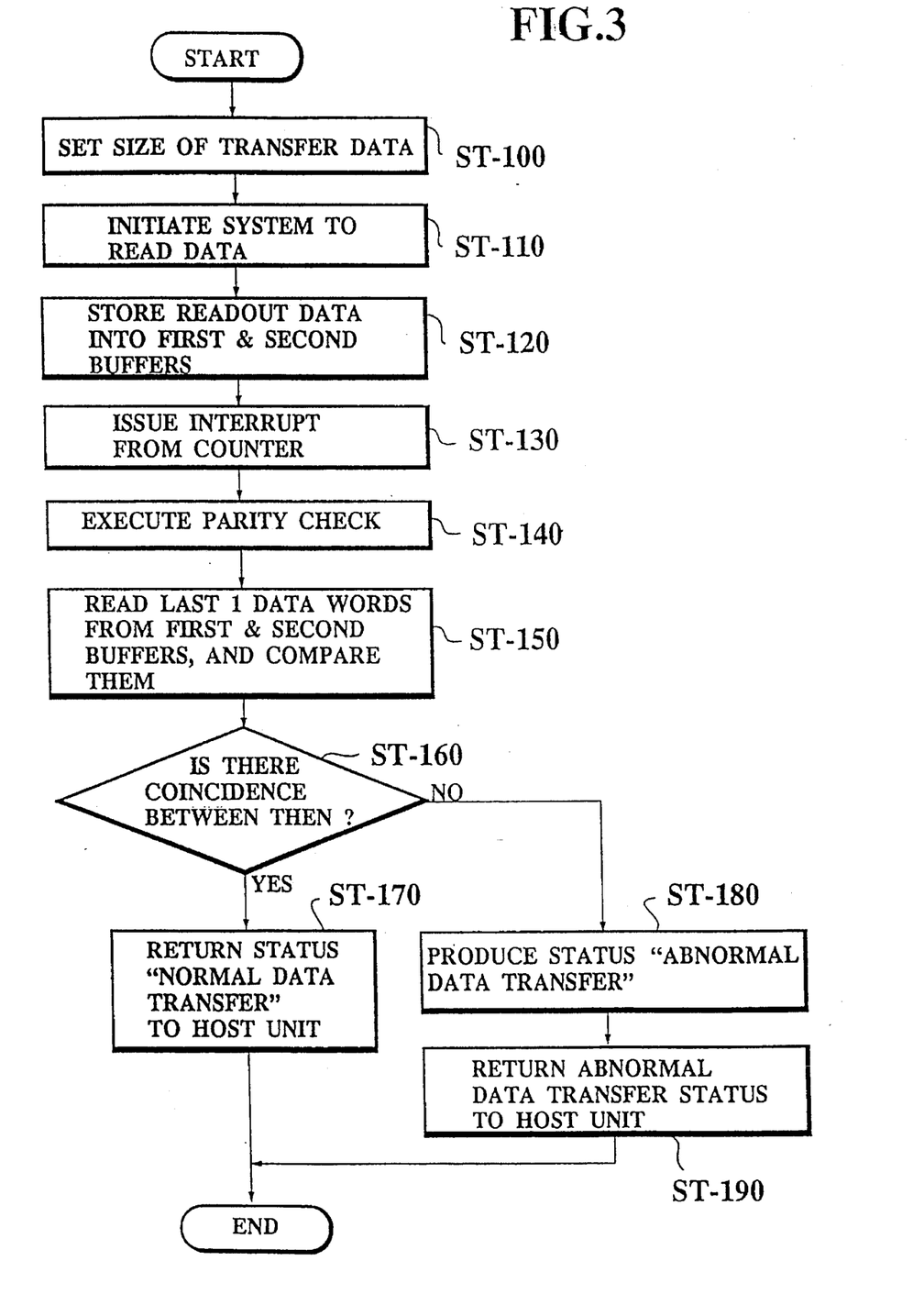
FIG. 3 is a flow chart illustrating overall operation of the first preferred embodiment of the destructive data readout prevention apparatus.

Referring now to the flow chart shown in FIG. 3, overall operation of the first destructive data readout prevention apparatus will be described. Upon initiation of this destructive data readout prevention apparatus represented in FIGS. 1A and 1B, a command is issued from the microprocessor 25 and supplied to the disk control circuit 19 in order that an indication of the size of the data stream to be transferred, e.g., 5 data blocks, be set to a counter (not shown in detail) of microprocessor 25 at step ST-100. The data transfer operation is initiated at step ST-110. Upon receipt of an initiate command, a series of desired data (e.g., 5 data blocks) is accessed by the disk control circuit 19, so that the desired data stream is derived from the magnetic disk (not shown in detail). Under control of disk control circuit 19, the desired data stream is transferred via the data transmission path 17 to the first buffer 21 and thereafter to the second buffer 29 at step ST-120.

Every time a data stream is read out from the magnetic disk unit 5 and is transferred to the first and second buffers 21 and 29 under control of the disk control circuit 19, the counter is counted down. When the count value of this counter becomes zero, an interrupt command is issued from this counter under control of the microprocessor 25 at step ST-130. Upon issuance of the interrupt command, the normal parity check is carried out by the parity check circuits 23, 33A and 33B at step ST-140. The last data word of the data stream from the second buffer 29, which has been stored in the first memory region 55 of RAM 53, is read and thereafter stored into the first general-purpose register 59. The last data word of the first buffer 21, which has been stored in the second memory region 57, is read and then stored in the second general-purpose register 61. A comparison is made between these last data words in the comparing circuit 65 (see FIG. 2) at a step ST-150.

At a subsequent step ST-160, a check is made to determine whether or not the former data word in general purpose register 59 is coincident with the latter data word in general purpose register 61. If "YES", then the transfer control process is advanced to step ST-170 at which a status signal indicating that a normal data transfer operation has been completed is produced from the comparison circuit 65, and accordingly, is returned to the host unit (CPU 200). If the result of the coincidence test in step ST-160 is NO, then another status signal representing the performance of an abnormal data transfer operation is produced from the comparison circuit 65 at step ST-180. Thereafter, this abnormal data transfer status signal is similarly returned to the host unit at step ST-190.

As a consequence, while the data streams read out from the magnetic disk unit 5 are transferred via the data transmission path 17 to the main memory unit 1, a faulty data transfer operation, e.g., a data stream having a shortage of one data word, may be quickly detected. Thereby a destructive data readout operation may be prevented prior to further data processing operations in the computer 100. Furthermore, reliability of the entire system may be improved, as compared with a conventional data transfer control system.

It should be noted that although the data read from the magnetic disk unit are transferred to the main memory unit of the computer in the above-described first preferred embodiment, other data read from the main memory may be transferred to the magnetic disk unit using this approach. Alternatively, a magnetic tape unit may be utilized instead of the above-explained magnetic disk unit.

It should also be noted that although the coincidence check was done in the last data word of the respective buffered data streams in the above-described first embodiment, the present invention is not limited thereto. For instance, such a coincidence check may be performed for an arbitrary data word, and/or for a plurality of predetermined data words "N" ("N" being greater than 1) counted from the last data word.

A Second Preferred Embodiment

Figure 4A:
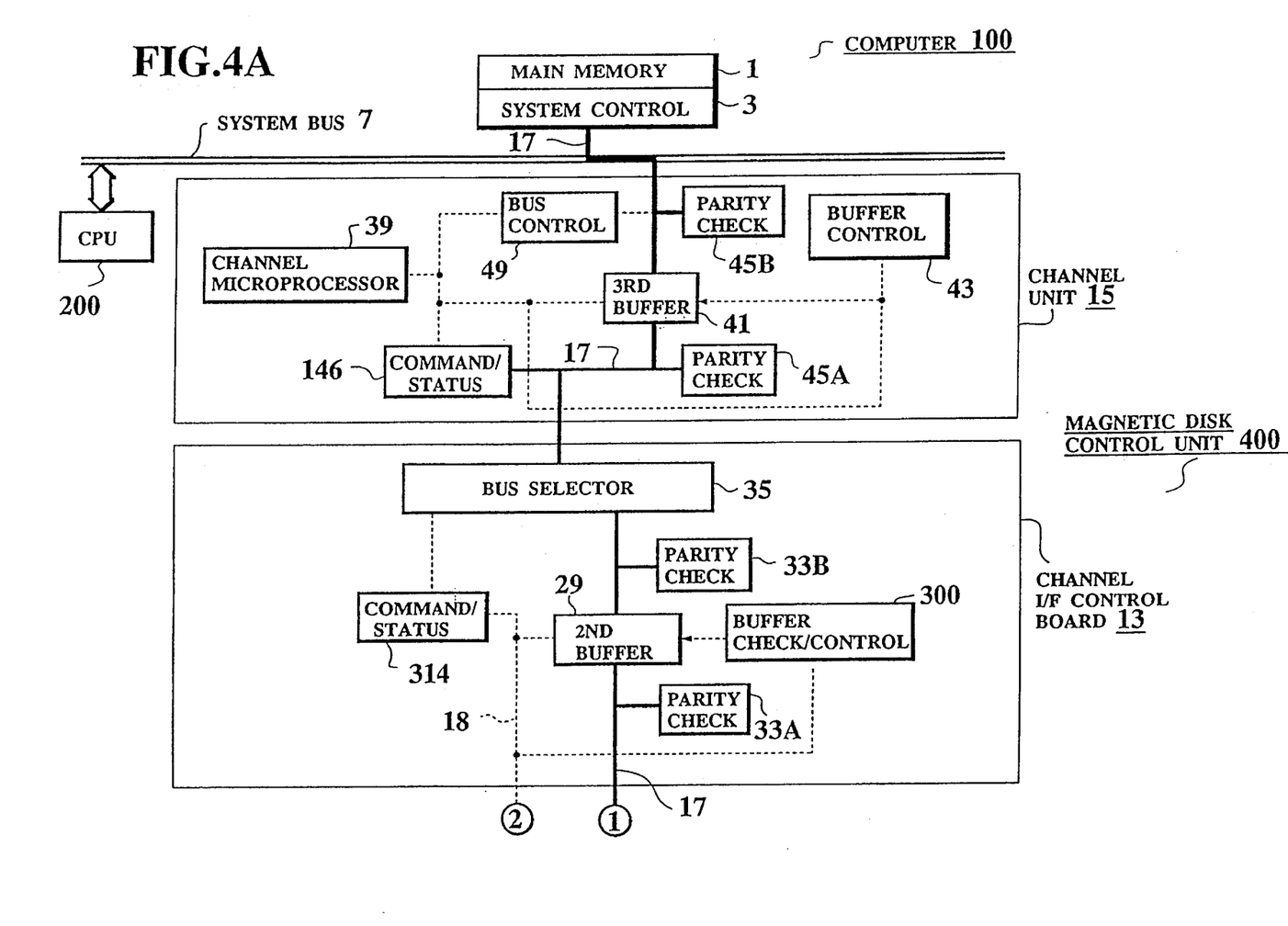
FIGS. 4A and 4B are schematic block diagrams illustrating an overall arrangement of a computer destructive data readout prevention apparatus according to a second preferred embodiment of the invention.
Figure 4B:
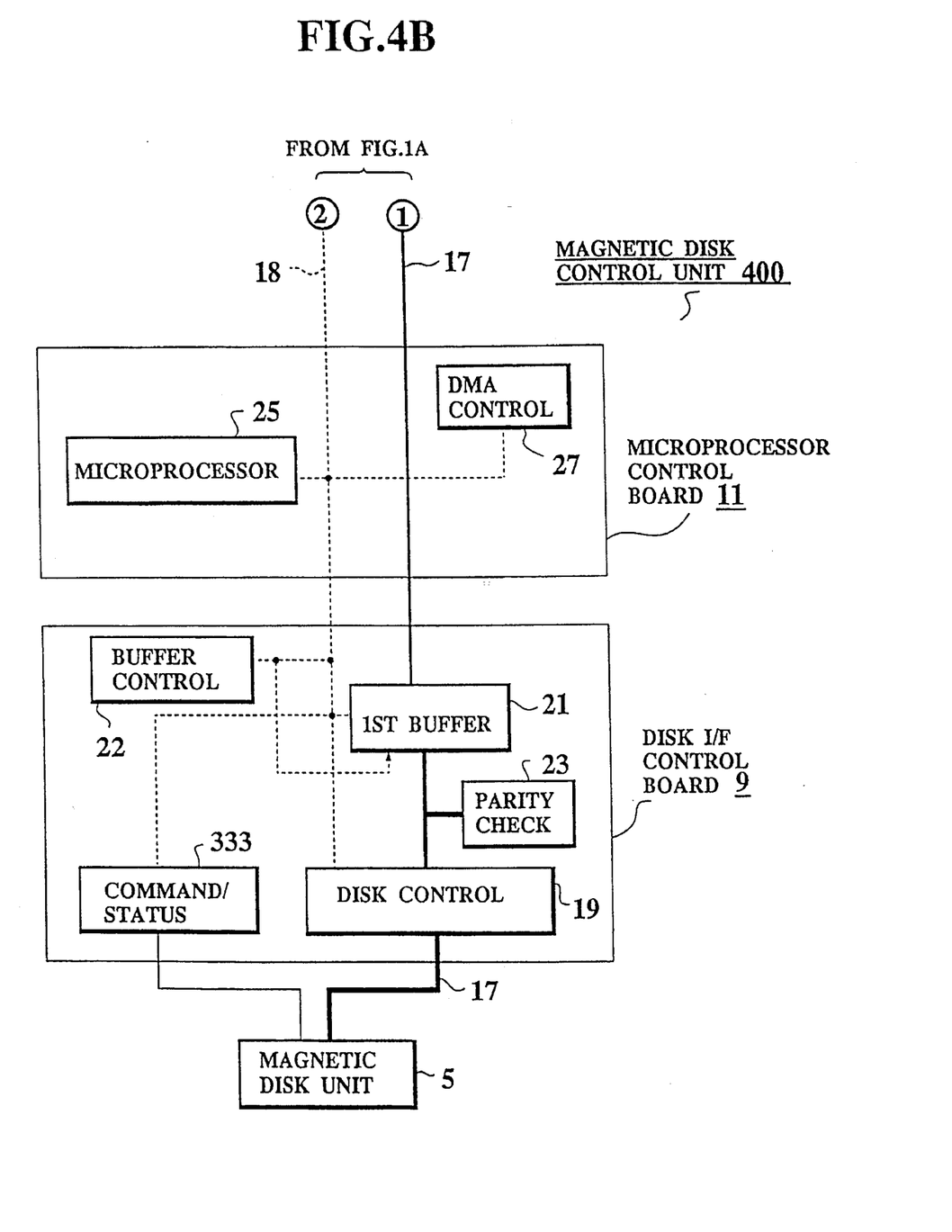

FIGS. 4A and 4B illustrate an overall arrangement of a computer destructive data readout prevention apparatus according to a second preferred embodiment of the invention. This second preferred embodiment employs the second underlying principle discussed above. It should be noted that the same reference numerals shown in FIGS. 1A and 1B will be employed as those for denoting the same or similar circuit elements in the drawings of the second embodiment.

The computer 100 includes the main memory unit 1, the system control unit 3, the system bus 7 and the channel unit 15. The channel unit 15 includes the channel microprocessor 39, the system bus control circuit 49, the DMA data buffer (i.e., third buffer) 41, the buffer control circuit 43, a command/status judging circuit 146, and two parity check circuits 45A and 45B.

A magnetic disk control unit 400 is arranged with the channel I/F (interface) control 13 coupled to the computer 100, the microprocessor control board 11 for controlling the entire magnetic disk control unit 400 and also the disk I/F control board 9 coupled to the magnetic disk unit 5, for receiving the data read out from magnetic disk unit 5.

In channel I/F control board 13, there are employed the data transfer buffer memory circuit (i.e., second buffer) 29, and a buffer check/control circuit 300. This buffer check/control circuit 300 is a feature of the second embodiment of the destructive data readout prevention apparatus. The buffer check/control circuit 300 controls the data transfer operation with respect to the data transfer buffer circuit 29, and furthermore checks the storage conditions of this second buffer circuit 29, whereby a full flag and an empty flag are produced.

In addition, a command/status judging circuit 314, the parity check circuits 33A, 33B, and the bus selector 35 are employed in this channel I/F control board 13.

In the microprocessor control board 11, there are provided both a microprocessor 321 for executing a control operation by a firmware, and the DMA control circuit 27.

In the disk I/F control board 9, there are provided the disk control circuit 19, the read data DMA data buffer memory circuit (i.e., first buffer circuit) 21, a command/status judging circuit 333, and the parity check circuit 23.

A description is now made of the overall data transfer control operations performed by the second embodiment of a destructive data readout prevention apparatus. It should be noted that data are transferred through a data path 17 indicated by a solid line, whereas access commands/status signals from the microprocessor 321 are transferred through a path 18 indicated by a dotted line.

Data read out from the magnetic disk unit 5 is transferred as a data stream via the data transmission path 17 as shown in FIGS. 4A and 4B to the main memory unit 1 of the computer 100. As apparent from FIGS. 4A and 4B, three buffer circuits (first to third buffers) 21, 29 and 41 are employed on this data transmission path 17.

A readout data transfer sequence occurs as follows. The readout data flows from the magnetic disk unit 5 through the first buffer 21, the second buffer 29 and the third buffer 41 to the main memory unit 1.

The data transfer control/storage check operations by the buffer check/control circuit 300 are performed in such a manner that when the second buffer circuit 29 is fully filled or stored with the data streams, a "full" flag is set, whereas when the second buffer circuit 29 becomes empty, an "empty" flag is set. These "full" and "empty" flags are readable by way of the firmware of the microprocessor 321 employed in the microprocessor control board 11.

In accordance with the second embodiment of the destructive data readout apparatus, the data transfer operation may be executed by utilizing the data transfer buffer (second buffer) circuit 29. That is, when the second buffer circuit 29 commences receipt of data from the disk I/F control board 9, the data are gradually stored therein (namely in the second buffer 29), and also some of data start to be transferred to the channel unit 15.

When the data transfer operation is interrupted e.g., for reasons discussed later occurring in the computer 100, the data read out from the magnetic disk unit 5 remain stored in the second buffer 29, and then the "full" flag is set by the buffer check/control circuit 300. However, at some point in time the data transfer operation is restarted at the channel unit 15 of the computer 100 unless a fault happens to occur by which the data transfer operation is interrupted. Finally, no data is left in the second buffer 29, so that the data transfer operation with respect to the desired data stream is completed. Therefore, the empty flag is set by the buffer check/control circuit 300. In other words, if a normal data transfer operation is accomplished, the storage condition of this second buffer 29 must become "empty", so that the empty flag should be set by the buffer check/control circuit 300.

Assume now that a certain hardware problem happens to occur, and accordingly, for instance, five data blocks with 1 extra data word are read from the magnetic disk unit 5, the parity bits are added to the data blocks for a predetermined data length thereof, and the parity check operations are executed by the respective parity check circuits 23, 33A, 33B, 45A and 45B along the data transmission path 17. Since both the data blocks and the parity bits are simultaneously received, the parity checking function does not work at all when such an extra one data word is transferred, so that such an abnormal data transfer operation cannot be detected in these parity check circuits, as previously explained in connection with the conventional data transfer operation.

However, in accordance with the second principle of the invention as discussed above, since the storage conditions of the second buffer circuit 29 are monitored by the buffer check/control unit 300 when the data transfer operation of a predetermined data stream (e.g., 5 data blocks) is completed, the above-described abnormal data transfer operation can be detected as follows. In the case of such an abnormal data transfer operation that one extra data word in addition to five data blocks are transferred from the magnetic disk unit 5 via buffer circuits 21, 29, 41 to the main memory unit 1, the one extra data word remains in the second buffer circuit 29. As a result, the storage condition of the second buffer 29 is not brought into the "empty" condition when the transfer operation of only a predetermined data stream, i.e., five data blocks, is completed. Thus, the "empty" flag cannot be set by the buffer check/control circuit 300.

When the above-described data transfer operation is accomplished, a check is made to determine whether or not the "empty" flag is set under control of the firmware of the microprocessor 321. If such an empty flag has not yet been set by the buffer check/control circuit 300, the present data transfer operation should be interrupted by the microprocessor 321. Thereby, the above-described abnormal (faulty) data transfer operation for the main memory unit 1 of the computer 100 can be avoided and thus, the destructive data readout operation from the magnetic disk unit 5 can be prevented.

Referring now to the flow chart shown in FIG. 5, a more detailed data transfer operation effected in the above-explained second embodiment of a destructive data readout prevention apparatus represented in FIGS. 4A and 4B will be described.

Figure 5A:
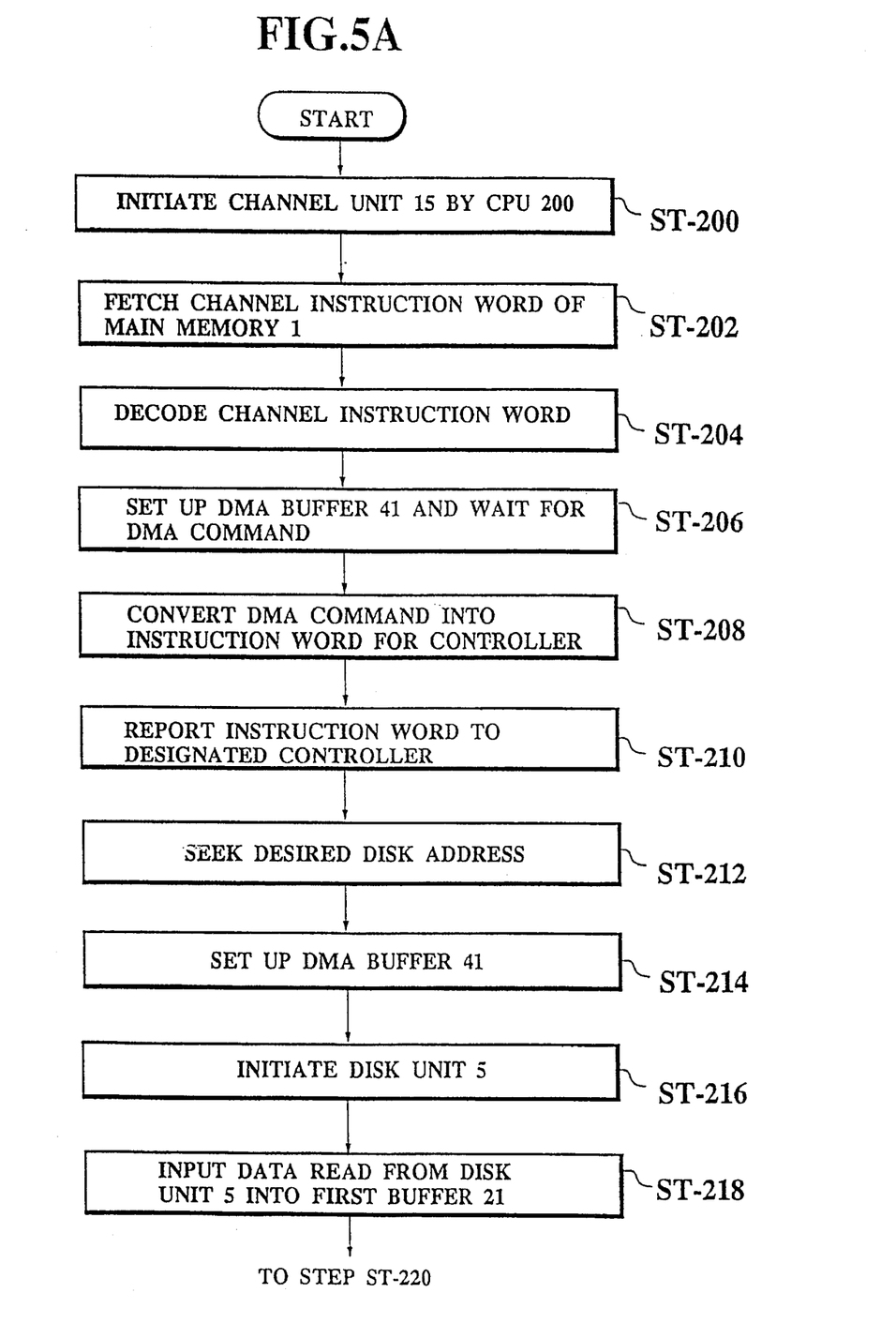
FIGS. 5A to 5C are flow charts illustrating the data transfer control operations performed by the second embodiment of the destructive data readout prevention apparatus shown in FIGS. 4A and 4B.

At a first step ST-200 of the flow chart shown in FIG. 5A, the channel unit 15 is initiated by the CPU 200. Channel unit 15 fetches a channel instruction word of the main memory unit 1 at step ST-202. The channel instruction word is decoded by the channel unit 15 at step ST-204. Subsequently, the DMA buffer circuit (third buffer) 41 is set up to wait for a DMA command issued from the system control circuit 3 at step ST-206. Upon receipt, this DMA command is converted into an instruction word for designating a predetermined controller at step ST-208.

Thereafter, this instruction word is reported from the channel unit 15 to the designated controller at step ST-210. At step ST-212, the controller seeks a desired disk address in response to the received instruction word. Accordingly, various setup operations for the DMA buffer circuit (third buffer) 41 are executed by the controller. For instance, a size of data transfer operation is set and the full/empty flags for the second buffer circuit 29 are initialized. Next, the magnetic disk unit 5 is initiated at step ST-216. Further, data read from the magnetic disk unit 5 is inputted into the first buffer 21 at a step ST-218.

Figure 5B:
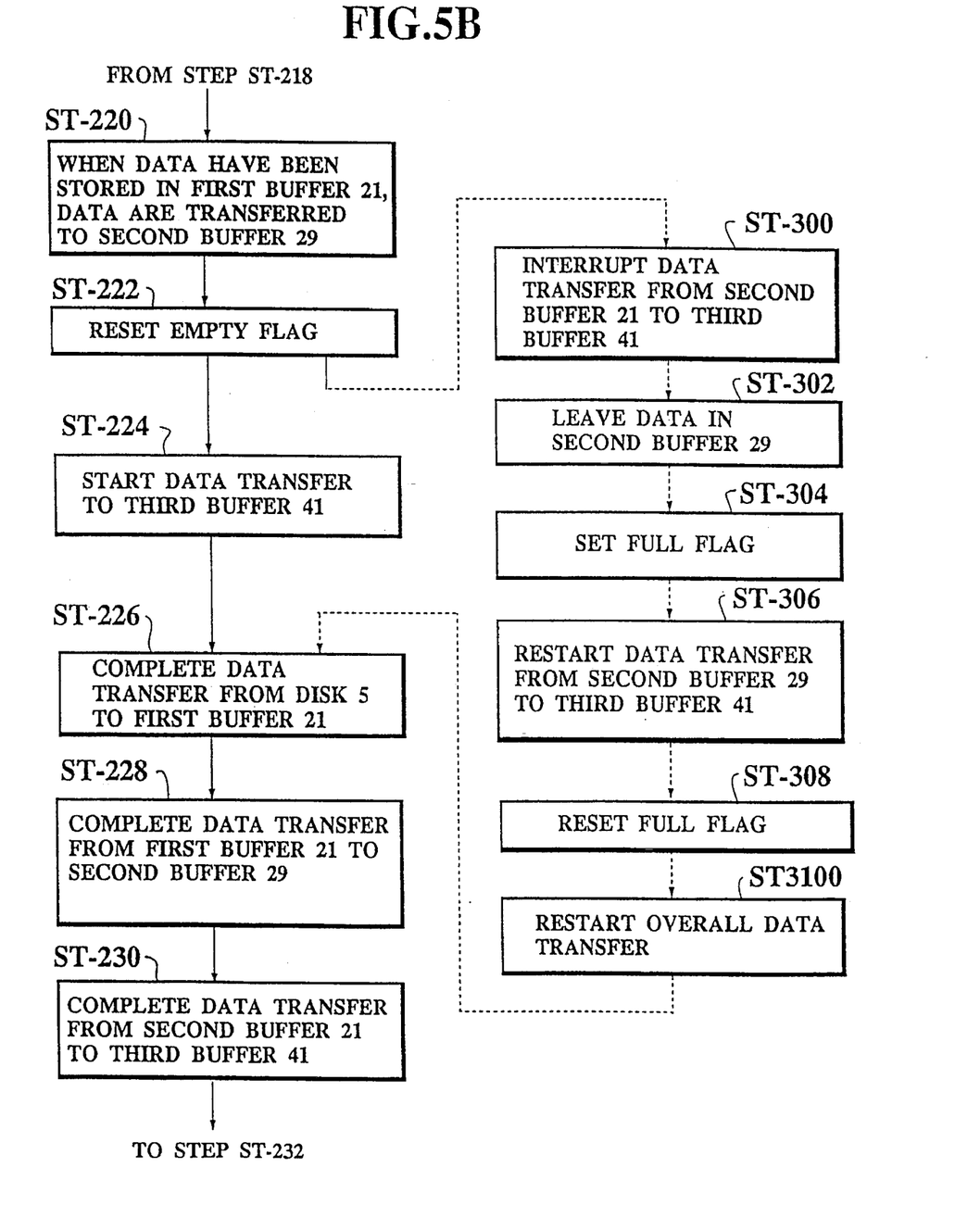

Referring now to the flow chart shown in FIG. 5B, further steps in the data transfer control operation are explained.

At step ST-220, when the data having a predetermined data size have been stored in the first buffer circuit 21, transfer of these stored data to the second buffer circuit 29 is commenced. Since several data are entered into the second buffer 29, the empty flag is reset under control of the buffer check/control circuit 300 at step ST-222.

Under such a circumstance, there are typically two states: In the first state, the data stored in the second buffer 29 starts to be transferred to the third buffer circuit 41 (see step ST-224). In a second state, the data transfer operation from the second buffer circuit 29 to the third buffer circuit 41 is temporarily interrupted for some reason, e.g., overloads of the system bus 7, but is then restarted (see the subroutine indicated by the dotted line, i.e., steps from ST-300 to ST-310, which will be described later).

Referring back to the previous step ST-224, the data transfer operation from the second buffer circuit 29 to the third buffer circuit 41 is carried out. On the other hand, the data transfer operation from the magnetic disk unit 5 to the first buffer circuit 21 is completed at step ST-226. Subsequently, the data transfer operations are successively completed from the first buffer circuit 21 to the second buffer circuit 29 at step ST-228, and from the second buffer circuit 29 to the third buffer circuit 41 at step ST-230.

At the next step ST-232 (shown in FIG. 5C), the microprocessor 321 employed in the microprocessor control board 11 checks the data transfer accomplishment conditions, e.g., if the transfer size is 0, and the empty flag for the second buffer circuit 29 is set. Thereafter, a status signal is produced and sent to the channel unit 15 under control of the microprocessor 321 at step ST-234. The channel microprocessor 39 checks the status signal issued from the controller at step ST-236. Next, the contents of the status signal is transferred from the channel unit 15 to CPU 200 at step ST-238, and then the contents of the status signal are reported from the channel unit 15 to CPU 200, whereby the series of second data transfer control operations is ended.

Returning back to step ST-222, it is considered at subsequent step ST-300 that the data transfer operation from the second buffer circuit 29 to the third buffer circuit 41 is temporarily interrupted, e.g., for one of the above-mentioned reasons. Then, since the data transfer operation from the second buffer circuit 29 to the third buffer circuit 41 is temporarily interrupted, while the data transfer operation from the first buffer circuit 21 to the second buffer circuit 29 is continued, the data transferred from the first buffer circuit 21 continue to be gradually stored in the second buffer circuit 29 at step ST-302. Accordingly, the "full" flag is set by the buffer check/control circuit 300 at step ST-304. Then, when the reasons for the interruption in the data transfer operation are solved, the transfer operation from the second buffer circuit 29 to the third buffer circuit 41 is restarted at step ST-306. The "full" flag is reset at step ST-308, and therefore the overall data transfer operation is restarted at step ST310. Subsequently, the data transfer process is advanced to step ST-226.

A Third Preferred Embodiment

In a third embodiment of a computer destructive data readout prevention apparatus (not shown in detail), a data transfer control operation is carried out based upon a combination of the above-described first and second underlying principles, i.e., both the data coincidence checking operation and the buffer storage condition checking operation. This third data transfer control operation will now be described with reference to the flow chart shown in FIG. 6.

Figure 5C:
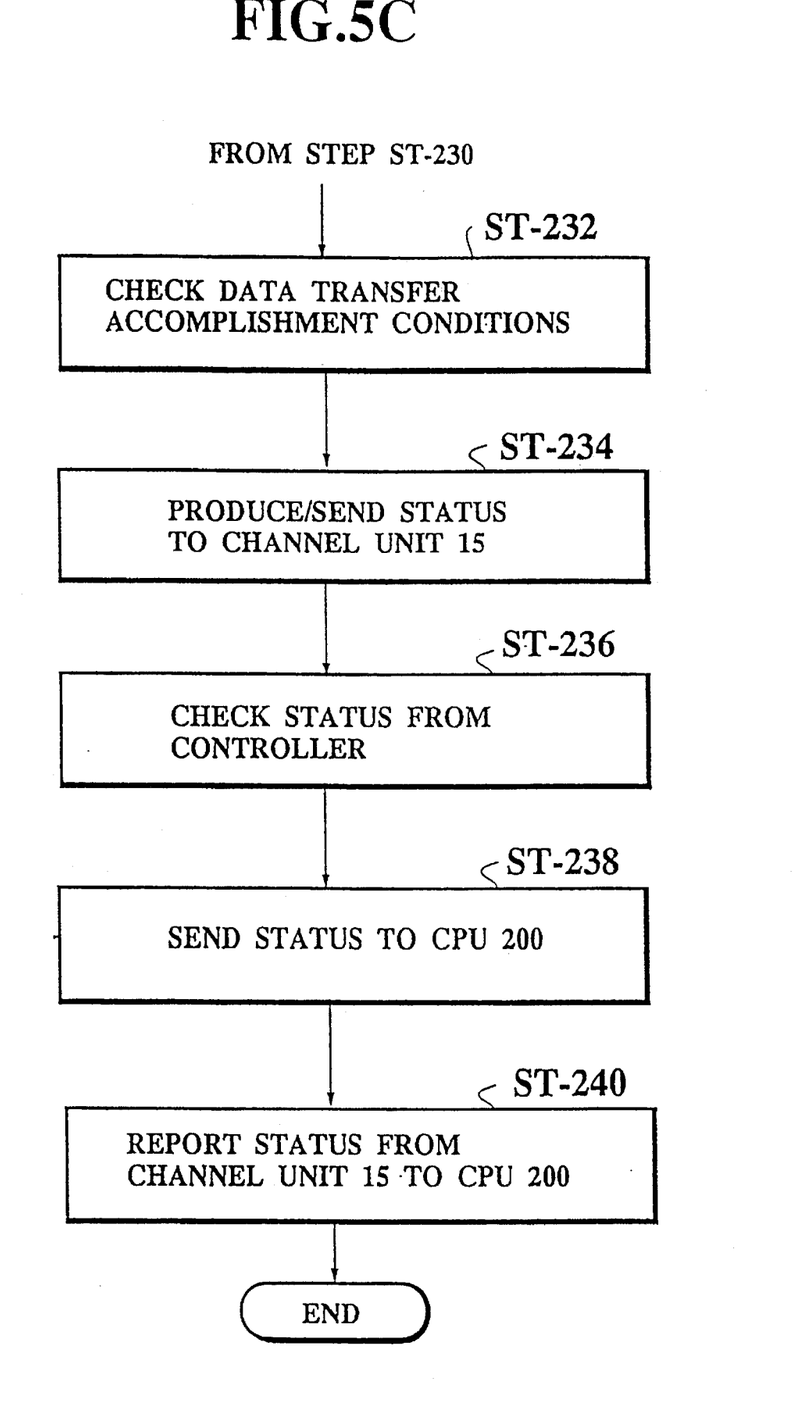
Figure 6:
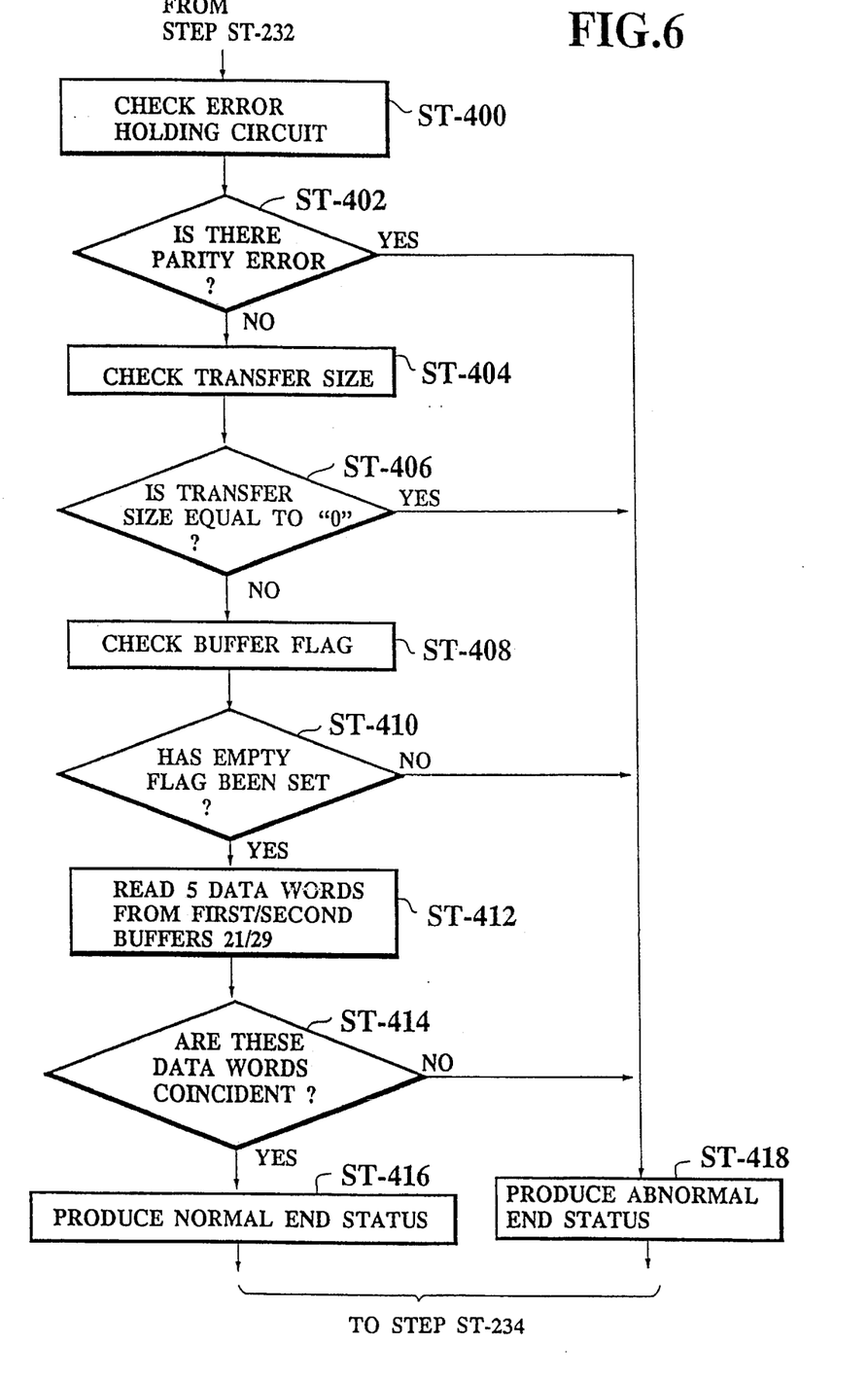
FIG. 6 is a flow chart illustrating the data transfer control operations executed by a computer destructive data readout prevention apparatus according to a third preferred embodiment of the invention.

The steps shown in FIG. 6 begin after completion of step ST-232 shown in FIG. 5C. Thus, after the data transfer accomplishment conditions have been checked under control of the microprocessor 321, the following data coincidence checking operation shown in FIG. 6 is performed. At step ST-400, the error holding circuit is investigated. A check is done to determine whether or not a parity error occurred at step ST-402. If NO, then the data transfer control process is advanced to step ST-404 at which the size of the transferred data is checked. At the next step ST-406, a further check is done to determine whether or not the accomplishment condition of the transfer size becomes 0. If NO, then the data transfer control process is advanced to step ST408 at which the flag for the second buffer circuit 29 is checked. Subsequently, another check is made to determine whether or not the empty flag has been set at step ST-410. If YES, then the process is advanced to step ST-412 at which, for instance, five data words forming the equivalent of the last data word of a predetermined data stream are read out from the first and second buffer circuits 21 and 29, respectively. Thereafter, a further check is done to determine whether or not these five data words of the first and second buffer circuits 21 and 29 are coincident with each other at step ST-414. If YES, then it can be judged by microprocessor 321 that a normal data transfer operation is completed, and therefore, the normal end status signal is produced at step ST-416. Thus, the data transfer control process is advanced to the previous step ST-234 shown in FIG. 5C.

On the other hand, if either a parity error occurs ("YES" at step ST-402), or the five data words from the first and second buffer circuits 21 and 29 are not coincident with each other ("NO" at step ST-414), then it can be judged by the microprocessor 321 that an abnormal data transfer operation is performed, and therefore the abnormal end status signal is produced at step ST-418. Upon generation of the abnormal end status signal, this status signal is sent to the channel unit 15 at step ST-234.

As apparent from the foregoing descriptions, the third computer destructive data readout prevention apparatus has the advantage that, since both the data coincidence checking operation and the buffer storage condition checking operation are executed with respect to one data steam to be transferred, the data transfer conditions can be assuredly checked and an abnormal data transfer operation can be firmly prevented.

What is claimed is:

1. A method of controlling transfer of a series of data between a first storage unit and a second storage unit, the method comprising the steps of:

receiving and temporarily storing in a first buffer memory said series of data read out from said first storage unit;

receiving and temporarily storing in a second buffer memory said series of data from said first buffer memory;

determining if a match exists between a preselected data word contained in said series of data temporarily stored in said first buffer memory and a preselected data word contained in said series of data temporarily stored in said second buffer memory, and, if said match exists, determining that a correct said series of data is available for transfer from said second buffer to said second storage unit.

2. The method recited in claim 1 wherein, if no said match exists, an error is indicated.

3. A method of controlling transfer of a series of data between a first storage unit and a second storage unit, the method comprising the steps of:

receiving and temporarily storing in a first buffer memory said series of data read out from said first storage unit;

receiving and temporarily storing in a second buffer memory said series of data from said first buffer memory means;

determining if said second buffer memory is empty after transfer of said series of data from second buffer memory and determining a correct transfer of data if said second buffer memory is empty after said transfer; and determining if a match exists between a preselected data word contained in said series of data temporarily stored in said first buffer memory and a preselected data word contained in said series of data temporarily stored in said second buffer memory, and, if said match exists, determining that a correct said series of data is available for transfer from said second buffer to said second storage unit.

4. The method recited in claim 3 wherein an error is indicated if said buffer memory is not empty after said transfer.

5. The method recited in claim 3 wherein an error is indicated if no said match exists.

6. The method recited in claim 3 further comprising the steps of:

counting a number of data words transferred from said first storage unit to said first buffer memory to arrive at a first data transfer word count;

counting a number of data words transferred from said second buffer memory to said second storage unit to arrive at a second data transfer word count; and determining if said second buffer memory is empty when said second data transfer word count equals said first data transfer word count.

7. An apparatus for controlling transfer of a series of data from an external storage unit to a main memory in a computer, comprising:

a first buffer memory for temporarily storing said series of data read out from said external storage unit;

a second buffer memory for receiving and temporarily storing therein said series of data transferred from said first buffer memory;

a first register for receiving and storing a preselected data word read out from said series of data temporarily stored in said first buffer memory;

a second register for receiving and storing a preselected data word read out from said series of data temporarily stored in said second buffer memory;

a comparison circuit to compare said preselected data word stored in said first register with said preselected data word stored in said second register, thereby checking if said preselected data word stored in said first register matches said preselected data word stored in said second register; and judging means for determining that a correct said series of data is available for transfer from said external storage unit to said main memory if said comparison circuit indicates that a match exists between said preselected data word in said first register and said preselected data word in said second register.

8. A data transfer control apparatus as recited in claim 7, wherein, if no said match exists, said apparatus produces an error indication.

9. A data control apparatus as recited in claim 8, further comprising a memory for storing each of said error indication.

10. A data transfer control apparatus as recited in claim 7, wherein said preselected data word read out from each of said first and second buffer memories is a single last data word contained therein.

11. A data transfer control apparatus as recited in claim 7, wherein said comparison circuit compares between a plurality of preselected data words read out from said first buffer memory and a plurality of preselected data words read out from said second buffer memory.

12. A data transfer control apparatus as recited in claim 11, wherein said comparison circuit compares between a plurality of preselected data words, including a single last data word, from said first buffer memory and a plurality of preselected data words, including a single last data word, from said second buffer memory.

13. A data transfer control apparatus as recited in claim 7, further comprising:

first parity check means for checking a parity bit contained in said series of data read out from said external storage unit;

second parity check means for checking a parity bit contained in said series of data transferred from said first buffer memory to said second buffer memory; and third parity check means for checking a parity bit contained in said series of data transferred from said second buffer memory to said main memory.

14. An apparatus for controlling transfer of a series of data from an external storage unit to a main memory in a computer, comprising:

a first buffer memory for temporarily storing said series of data read out from said external storage unit;

a second buffer memory for receiving and temporarily storing therein said series of data transferred from said first buffer memory;

a first memory region for temporarily storing said series of data read out from said first buffer memory;

a second memory region for temporarily storing said series of data read out from said second buffer memory;

a first register for storing a preselected data word contained in said series of data stored in said first memory region;

a second register for storing a preselected data word contained in said series of data stored in said second memory region; and a comparison circuit for comparing said preselected data word stored in said first register with said preselected data word stored in said second register, thereby checking if said preselected data word stored in said first register matches said preselected data word stored in said second register; and judging means for determining that a correct said series of data is available for transfer from said external storage unit to said main memory if said comparison circuit indicates that a match exists between said preselected data word in said first register and said preselected data word in said second register.

15. An apparatus for controlling transfer of a series of data from an external storage unit to a main memory in a computer, comprising:

a first buffer memory for temporarily storing said series of data read out from said external storage unit;

a second buffer memory for receiving and temporarily storing therein said series of data transferred from said first buffer memory;

buffer checking/controlling means for checking if said second buffer memory is empty after transfer of said series of data to said main memory, and for determining that a correct transfer of data has been carried out if said second buffer memory is empty after said transfer;

a first register for storing a preselected data word read out from said series of data in said first buffer memory;

a second register for storing a preselected data word read out from said series of data in said second buffer memory; and a comparison circuit for comparing said preselected data word stored in said first register with said preselected data word stored in said second register, thereby checking if said preselected data word stored in said first register matches said preselected data word stored in said second register; and judging means for determining that a correct said series of data is available for transfer from said external storage unit to said main memory if said comparison circuit indicates that a match exists between said preselected data word in said first register and said preselected data word in said second register.

16. A data transfer control apparatus as recited in claim 15, wherein said buffer checking/controlling means indicates an error if said second buffer memory is not empty after said transfer.

17. A data transfer control apparatus as recited in claim 15, wherein said judging means indicates an error if said match does not exist.

18. A data transfer control apparatus as recited in claim 15, wherein said preselected data word read out from each of said first and second buffer memories is a single last data word contained in said series of data stored therein.

19. A data transfer control apparatus as recited in claim 15, wherein said comparison circuit compares between a plurality of preselected data words read out from said first buffer memory and a plurality of preselected data words read out from said second buffer memory.

20. A data transfer control apparatus as recited in claim 15, further comprising:

first parity check means for checking a parity bit contained in said series of data read out from said external storage unit;

second parity check means for checking a parity bit contained in said series of data transferred from said first buffer memory to said second buffer memory; and third parity check means for checking a parity bit contained in said series of data transferred from said second buffer memory to said main memory.

21. An apparatus for controlling transfer of a series of data from an external storage unit to a main memory in a computer, comprising:

a first buffer memory for temporarily storing said series of data read out from said external storage unit;

a second buffer memory for receiving and temporarily storing therein said series of data transferred from said first buffer memory;

buffer checking/controlling means for checking if said second buffer memory is empty after transfer of said series of data to said main memory, and for determining that a correct transfer of data has been carried out if said second buffer memory is empty after said transfer;

a first memory region for temporarily storing said series of data read out from said first buffer memory;

a second memory region for temporarily storing said series of data read out from said second buffer memory;

a first register for storing a preselected data word contained in said series of data stored in said first memory region;

a second register for storing a preselected data word contained in said series of data stored in said second memory region; and a comparison circuit for comparing said preselected data word stored in said first register with said preselected data word stored in said second register, thereby checking if said preselected data word stored in said first register matches said preselected data word stored in said second register; and judging means for determining that a correct said series of data is available for transfer from said external storage unit to said main memory if said comparison circuit indicates that a match exists between said preselected data word in said first register and said preselected data word in said second register.

* * * * *